(12) United States Patent
Koch et al.

(10) Patent No.: US 6,490,044 B1
(45) Date of Patent: Dec. 3, 2002

(54) OPTIMIZED INTERFEROMETRICALLY MODULATED ARRAY SOURCE

(75) Inventors: Thomas L. Koch, Holmdel, NJ (US); Donald R. Scifres, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/154,929

(22) Filed: Sep. 17, 1998

Related U.S. Application Data

(62) Division of application No. 08/866,512, filed on May 30, 1997, now Pat. No. 5,870,512.

(51) Int. Cl.[7] ............... G02B 27/00; G02F 1/295
(52) U.S. Cl. ...................... 356/478; 359/577
(58) Field of Search ............... 356/478, 477; 359/577–578

(56) References Cited

U.S. PATENT DOCUMENTS

| | | |
|---|---|---|
| 4,552,457 A | 11/1985 | Giallorenzi et al. |
| 4,786,129 A | 11/1988 | Webb |
| 4,978,950 A * | 12/1990 | Capps ............... 340/783 |
| 5,101,450 A | 3/1992 | Olshansky |
| 5,184,243 A | 2/1993 | Henmi et al. |
| 5,199,086 A | 3/1993 | Johnson et al. |
| 5,239,401 A | 8/1993 | Olshansky |
| 5,301,058 A | 4/1994 | Olshansky |
| 5,303,079 A | 4/1994 | Gnauck et al. |
| 5,339,183 A | 8/1994 | Suzuki |
| 5,347,525 A | 9/1994 | Faris |
| 5,358,896 A | 10/1994 | Komatsu et al. |
| 5,359,449 A | 10/1994 | Nishimoto et al. |
| 5,394,489 A | 2/1995 | Koch |
| 5,440,416 A | 8/1995 | Cohen et al. |
| 5,446,574 A | 8/1995 | Djupsjöbacka et al. |
| 5,452,118 A | 9/1995 | Maruska |
| 5,479,539 A | 12/1995 | Goldsmith et al. |
| 5,488,680 A | 1/1996 | Dragone |
| 5,524,076 A | 6/1996 | Rolland et al. |
| 5,715,076 A | 2/1998 | Alexander et al. |
| 5,726,784 A | 3/1998 | Alexander et al. |
| 5,784,184 A | 7/1998 | Alexander et al. |
| 5,835,212 A * | 11/1998 | Kissa et al. ............. 356/345 |
| 5,999,283 A * | 12/1999 | Roberts et al. ........... 359/108 |
| 6,144,779 A * | 11/2000 | Binkley et al. ............ 385/8 |

OTHER PUBLICATIONS

Zah, C. E., et al., "Wavelength Accuracy and Output Power of Multiwavelength DFB Laser Arrays with Integrated Star Couplers and Optical Amplifiers", *IEEE Photonics Technology Letters*, vol. 8, No. 7, pp. 864–866 (Jul. 1996).

* cited by examiner

*Primary Examiner*—Samuel A. Turner
*Assistant Examiner*—Phil Natividad
(74) *Attorney, Agent, or Firm*—Kudirka & Jobse, LLP

(57) ABSTRACT

An improved interferometric modulator permits the reduction in size of optical transmitters. In one embodiment, the optical modulator includes amplifiers or attenuators as phase modulators. In another embodiment, two outputs from a combiner are fed to the modulator, thus avoiding the requirement for an input splitter in the modulator. Light passing through the modulator may be both phase-shifted and amplified or attenuated by optical regulator sections located in the modulator. In another embodiment, the transmitter is included as a multiple-wavelength optical communications source, where individual current sources are provided to actuate a number of light sources feeding into the combiner, a processor controls the operation of each light source, and a modulator driver receives a data input signal to be encoded on the output of the source. By combining a number of modulators, a gray scale modulator may be fabricated for producing a gray scale output, rather than a conventional binary level output.

13 Claims, 8 Drawing Sheets

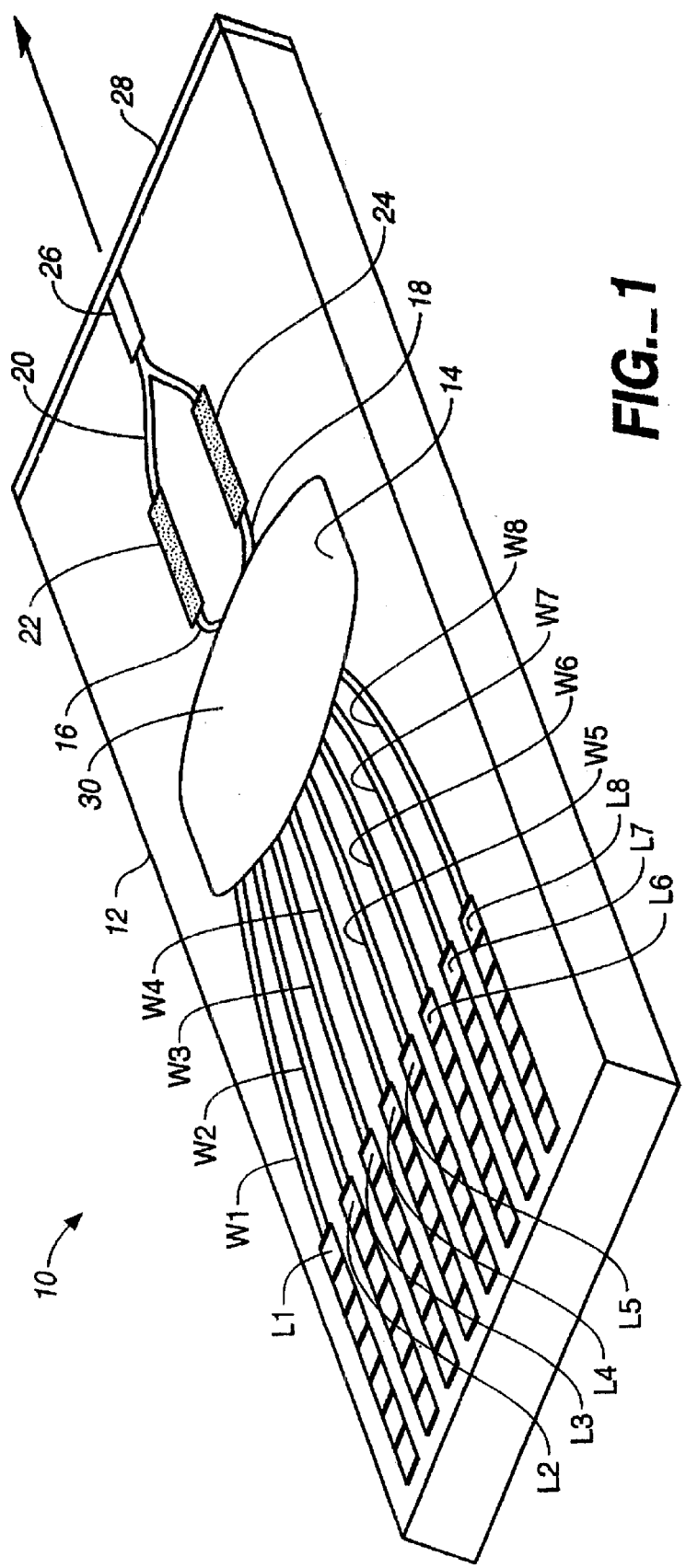
FIG._1

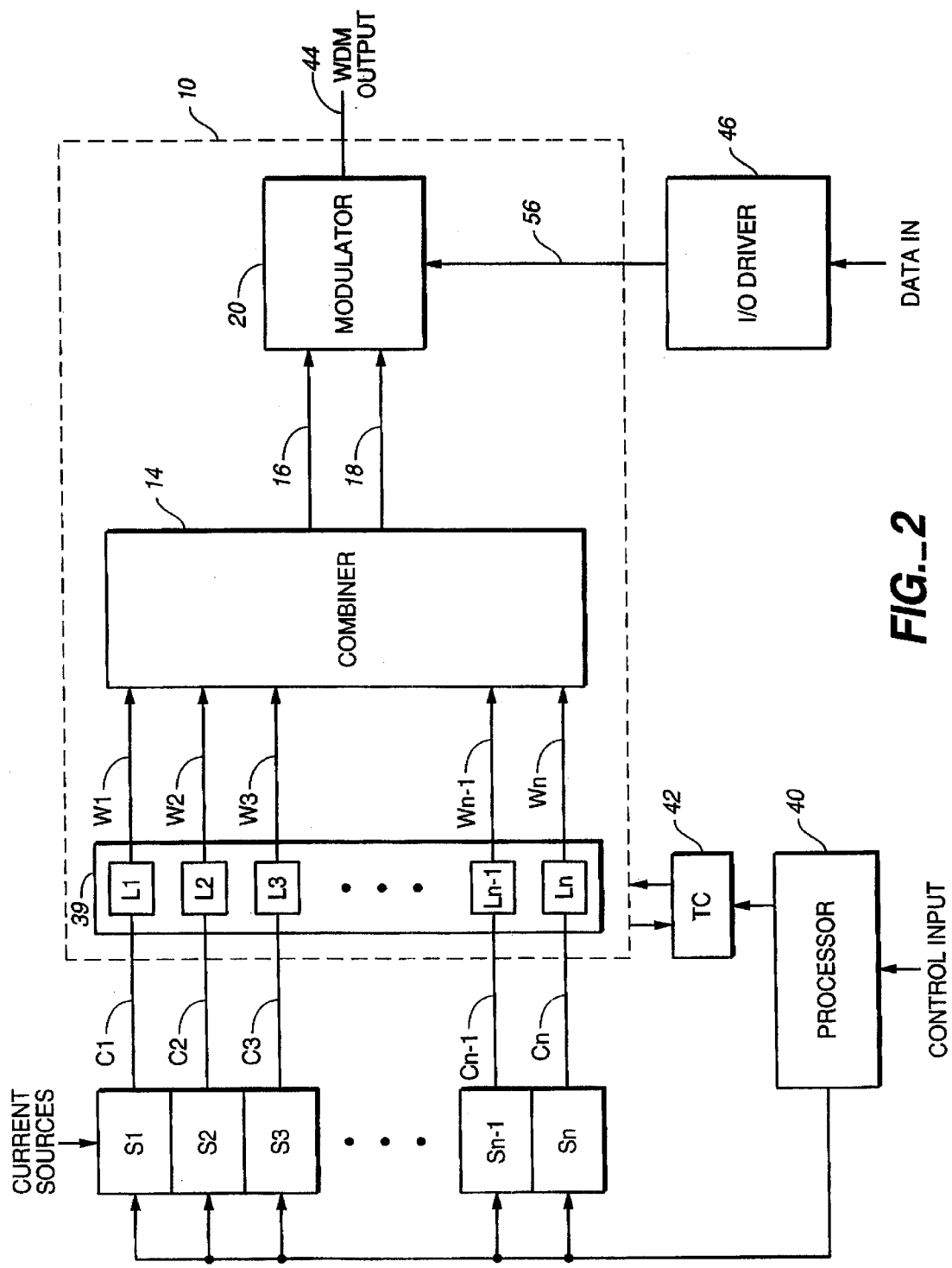
FIG._2

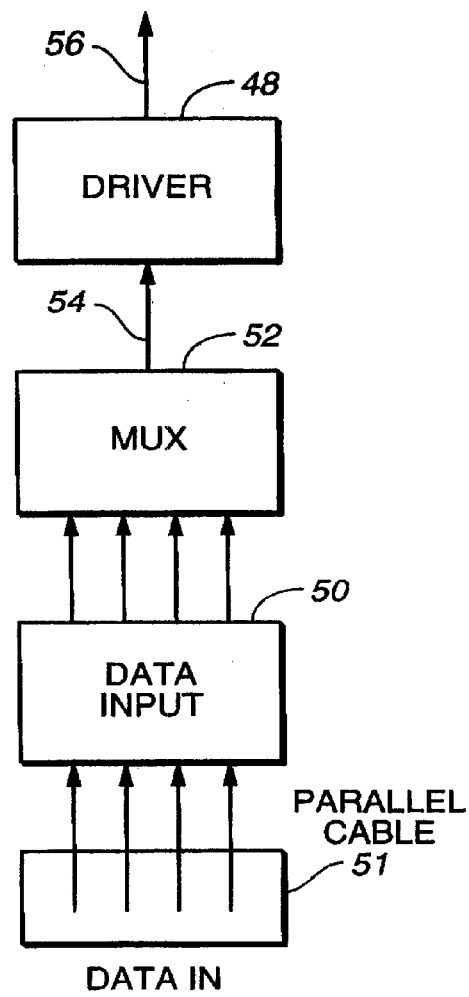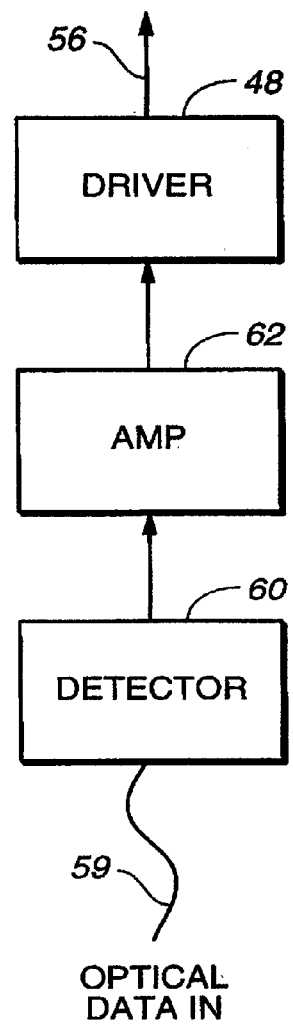
FIG._3A  FIG._3B

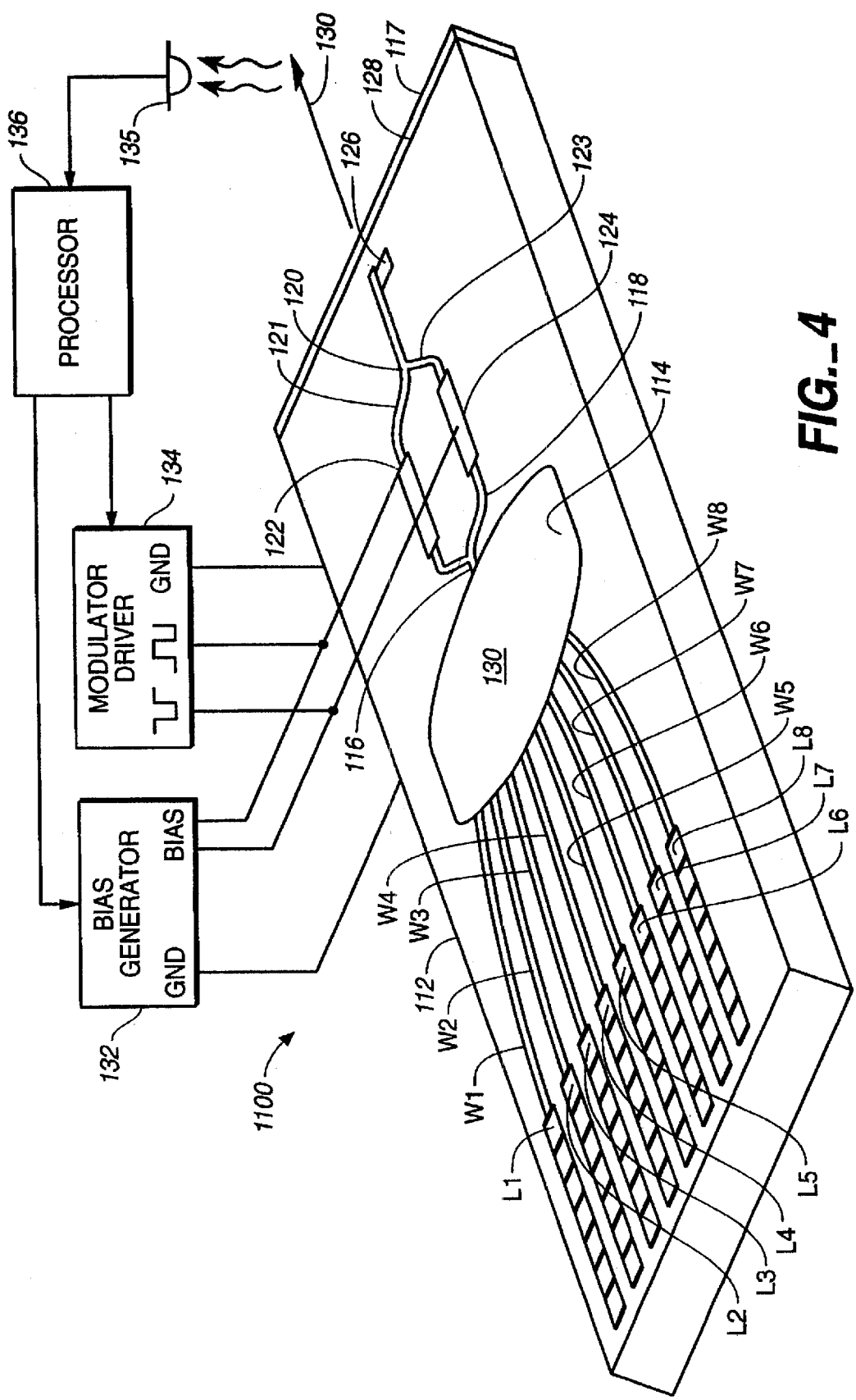
FIG._4

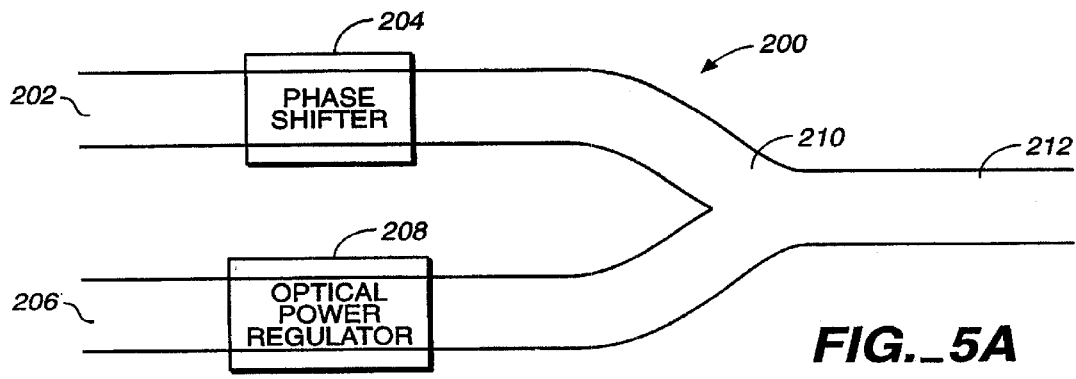
FIG._5A
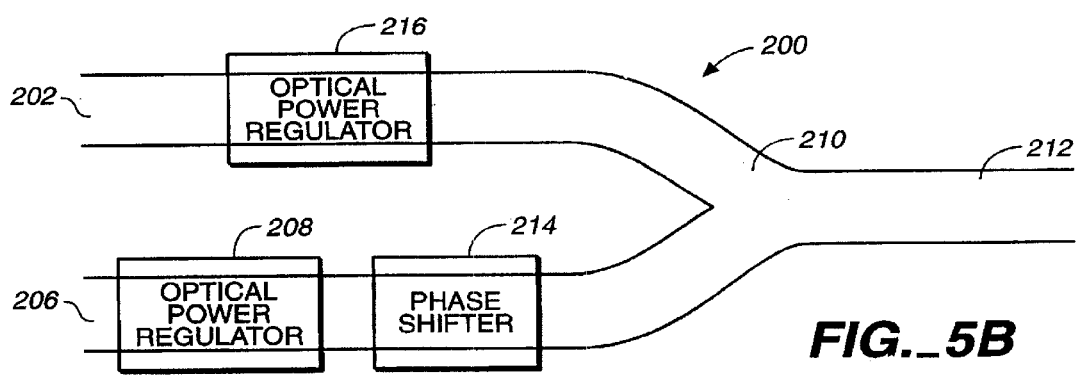
FIG._5B
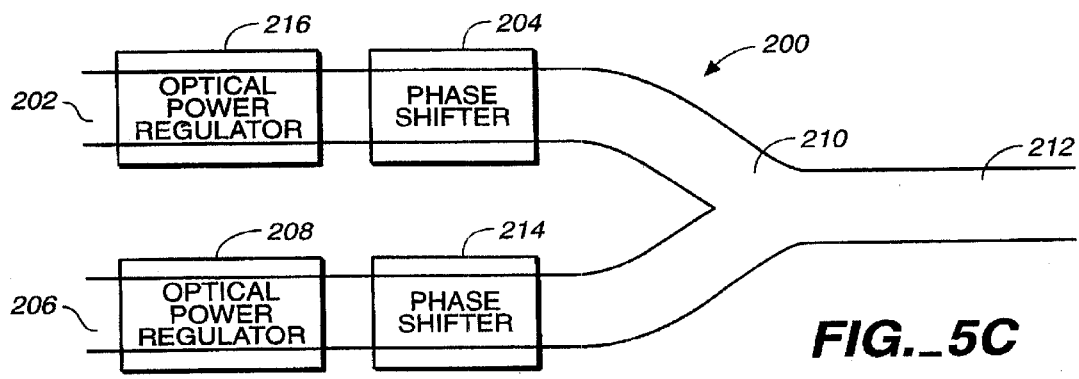
FIG._5C

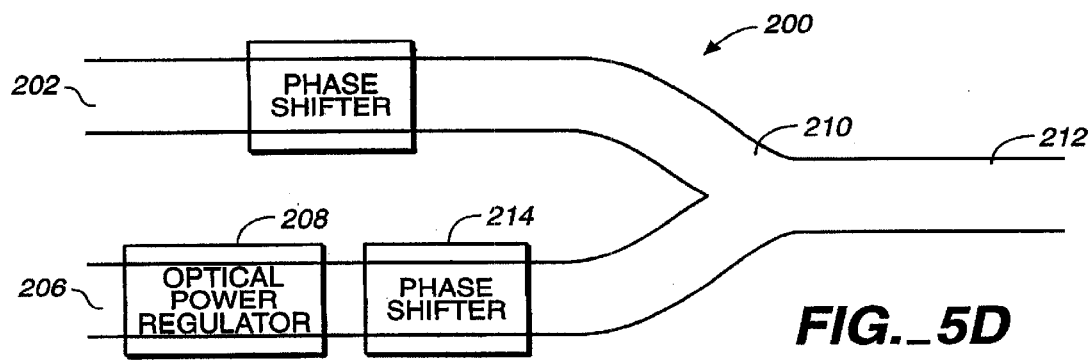
FIG._5D
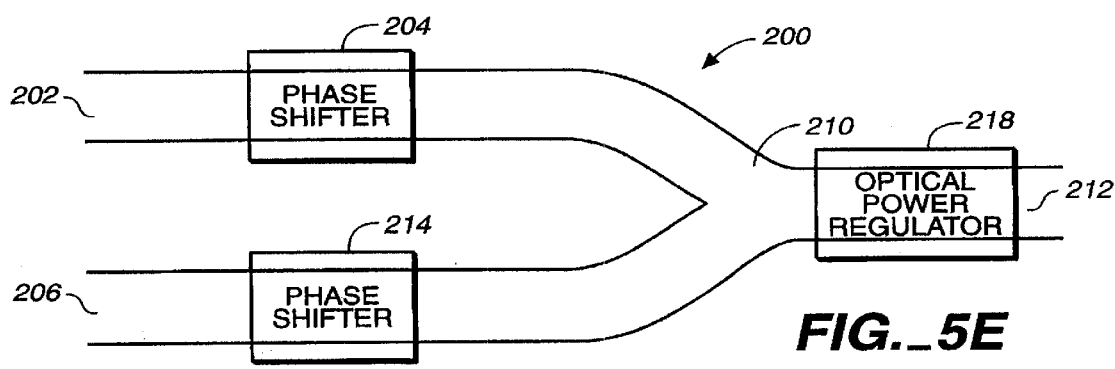
FIG._5E
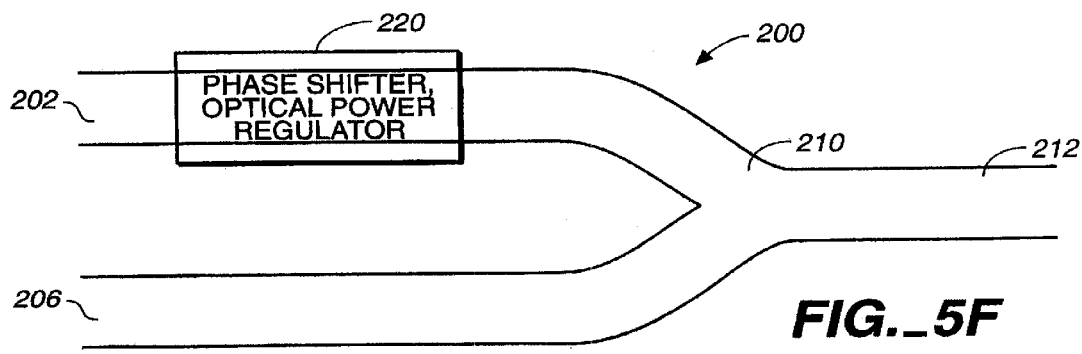
FIG._5F

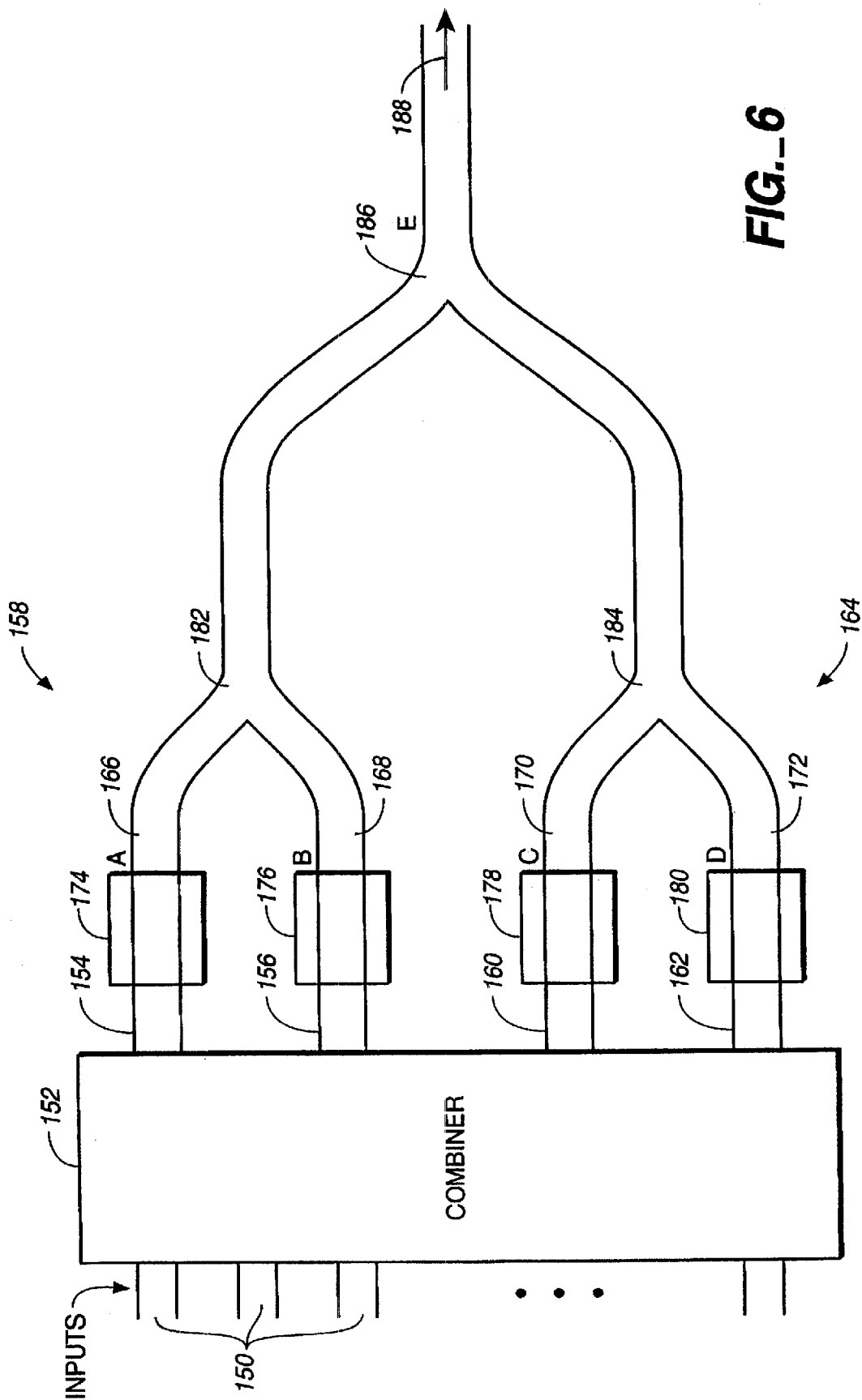
FIG._6

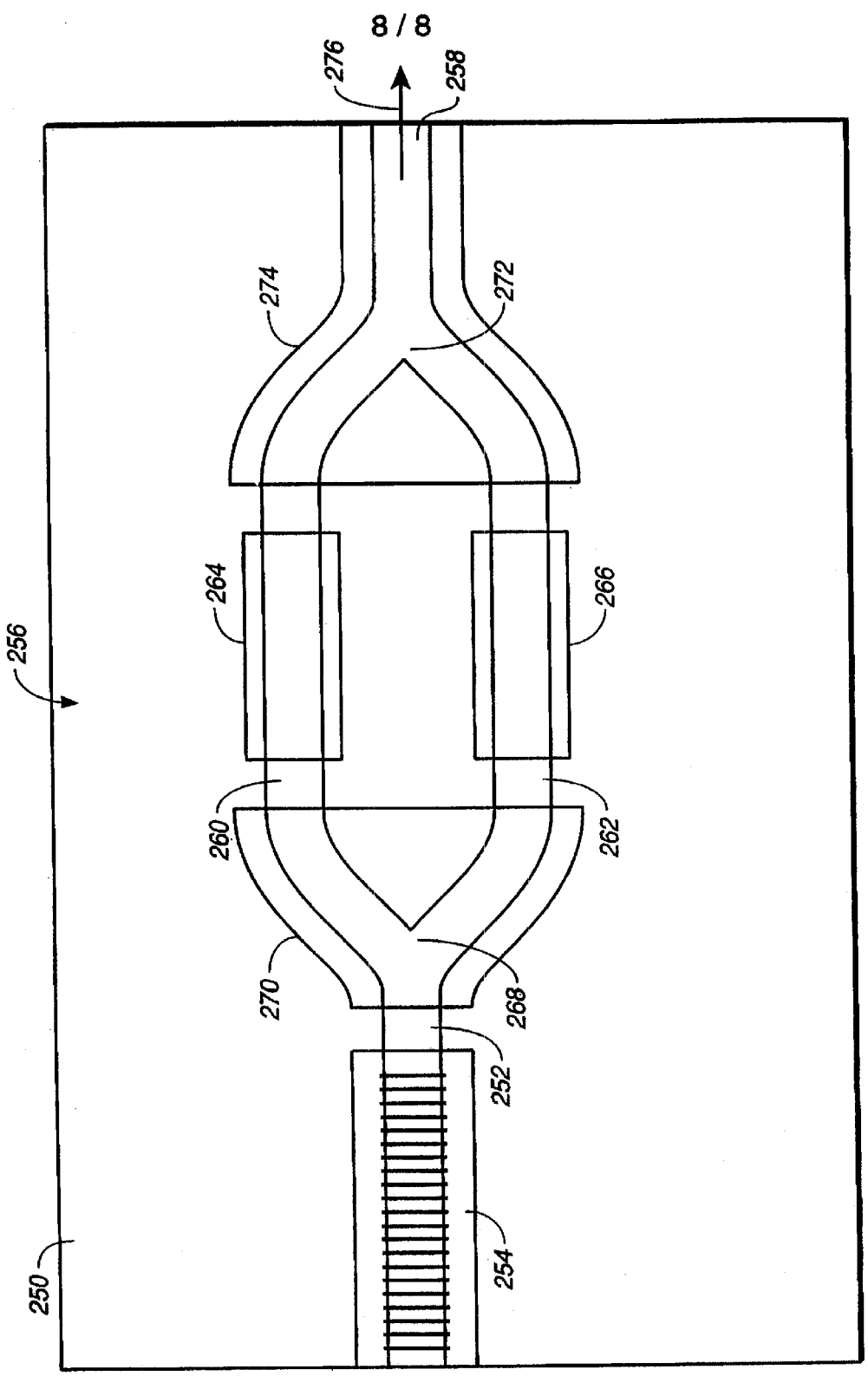
FIG._7

OPTIMIZED INTERFEROMETRICALLY MODULATED ARRAY SOURCE

CROSS REFERENCE TO RELATED APPLICATIONS

This application is a division of U.S. patent application Ser. No. 08/866,512, filed May 30, 1997 (now U.S. Pat. No. 5,870,512).

BACKGROUND

The present invention is directed generally to optical communications, and particularly to a modulated optical transmitter.

Wavelength division multiplexing (WDM) is gaining widespread use in optical communications because, unlike conventional communications systems where a higher transmission capacity usually requires faster components, the transmission capacity of a single optical fiber may be increased simply by making more effective use of the available bandwidth, without requiring the use of faster components. Also, WDM permits signals at different wavelengths to be routed to different destinations.

WDM transmitters commonly use a number of independently controllable, fixed single frequency sources whose outputs are combined into a single transmitter output. WDM transmitters typically fall into two categories, namely those in which all optical channels are capable of being modulated simultaneously and independently, and those where a single modulator is used to modulate the output of one or more lasers. Transmitters in the latter category are described as being wavelength selectable. Wavelength selectable WDM transmitters advantageously require only a single RF modulator connection, pose less stringent requirements on the quality of the optical output from the light sources, and may be used with conventional packaging. Consequently, the wavelength selectable transmitter is one of the more commonly used optical communications sources.

An example of a wavelength selectable transmitter is disclosed in U.S. Pat. No. 5,394,489, issued to an inventor of the present application. In an embodiment of the disclosed invention, the output from an array of individually actuable semiconductor lasers is combined in a combiner integrated on the same substrate as the lasers. An amplifier amplifies the single output taken from the combiner, and the amplified output is subsequently modulated in a modulator.

Interferometric modulators, such as the Mach-Zehnder modulator, demonstrate several favorable characteristics such as low or zero chirp, high power handling capabilities and low insertion loss. However, interferometric modulators conventionally suffer from the disadvantage of taking up a significant amount of space. This problem is compounded when an amplifier is added to the transmitter. Other types of modulator, for example the electro-absorption filter, take up less space, although they do not offer the same favorable chirp, power handling and insertion loss characteristics.

Factors such as component size and system complexity are important considerations in the development of optical communications systems. In addition, optical losses are generally reduced along with the number of components, i.e. when the system complexity is reduced. There is therefore a need to develop an improved WDM transmitter where the transmitter is smaller, the overall transmitter complexity is reduced, and where transmitter has fewer optical losses.

SUMMARY OF THE INVENTION

Generally, the present invention relates to a modulated optical transmitter. An embodiment of the invention is directed to an interferometric modulator that include an optical amplifier or an attenuator as a phase modulation element. The modulator may include combinations of phase shifters, amplifiers and attenuators in each arm for overall control of the output power and depth of modulation.

Other embodiments of the invention are directed to a wavelength division multiplexed optical transmitter that includes a number of individual light sources operating at independent frequencies. Outputs from each of the light sources are combined in an optical combiner. In one particular embodiment, the combiner has two output ports, each feeding into respective arms of an interferometric modulator. In another embodiment, the combiner has four output ports, feeding into two parallel modulators whose outputs are then combined to form a gray scale signal. In another embodiment, the combiner has one output port feeding into a modulator having an amplifier or attenuators disposed in at least one arm.

Advantages of transmitting the output from two combiner ports directly into respective arms of the interferometric modulator include increasing the amount of light entering the modulator and avoiding optical losses associated with an input y-branch of the modulator. The resultant increase in light transmitted by the modulator reduces the need for an amplifier integrated in the transmitter. The reduction in the number of transmitter components also reduces fabrication and system complexity, and reduces the overall size of the device.

Advantages of including amplifier or attenuator elements in the modulator include the ability to optimize the modulator's on/off ratio, and the overall control of modulator output power.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 1 is a perspective view of an embodiment of a wavelength division multiplexed (WDM) transmitter on a substrate;

FIG. 2 is a block schematic of a WDM optical communications subsystem according to an alternative embodiment of the present invention;

FIGS. 3A and 3B are block schematics of different embodiments of the input/output driver of the subsystem of FIG. 2.

FIG. 4 illustrates another embodiment of wavelength division multiplexed transmitter having a modulator with optical power regulators;

FIGS. 5A–5F illustrate embodiments of an interferometric modulator having an optical power regulator;

FIG. 6 illustrates a combination of modulators for generating a gray scale output; and FIG. 7 illustrates an embodiment of an interferometric modulator having amplifier sections.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical communications systems using wavelength division multiplexing (WDM) for increasing the capacity of optical communications channels. The present invention is believed to be particularly well suited for use as a wavelength selectable transmitter in WDM optical networks.

FIG. 1 illustrates a wavelength division multiplexed optical transmitter 10 in accordance with one particular embodiment of the present invention. A number of lasers L1–L8 are integrated on a substrate 12, by growing, fabricating, or the like. The lasers L1–L8 operate respectively at different, fixed, single wavelengths $\lambda 1$–$\lambda 8$ to comply with the requirements of WDM. The lasers L1–L8 may be grown from a III–V semiconductor material, such as InP, GaAs, their alloys, or the like. For example, the active region of the lasers L1–L8 may be GaAs or InGaP confined by higher refractive index, p- and n-doped layers of AlGaAs or AlGaP respectively.

The lasers L1–L8 may, for example, be distributed feedback (DFB) lasers fabricated on the substrate 12 with different Bragg grating periods to produce the different wavelengths. Alternatively, the lasers L1–L8 may be of different types, including distributed Bragg (DBR) structures or other single fixed wavelength architectures. Backup lasers may be provided for any of the wavelengths $\lambda 1$–$\lambda 8$ in order to introduce redundancy.

A proposed International Telecommunications Union (ITU) standard for an optical communications channel allocation grid has a 100 GHz channel spacing. For lasers operating at around 1550 nm, a common wavelength for optical communications, this channel spacing corresponds to a wavelength separation of approximately 0.81 nm between lasers.

Waveguides W1–W8, integrated on the substrate 12 by growth, fabrication, or the like, respectively guide the outputs from lasers L1–L8 to a combiner 14. The combiner 14 combines the light from the waveguides W1–W8 and produces two outputs into output waveguides 16 and 18. Waveguides W1–W8 and combiner 14 may be of the same construction as lasers L1–L8 and may have, for example, a waveguide composed of GaAs or InGaP confined by higher refractive index layers of AlGaAs or AlGaP respectively.

The output waveguides 16 and 18 form two branches of an interferometric modulator 20 similar to a Mach-Zehnder modulator or other two-branched modulator. The first and second output waveguides 16 and 18 respectively feed into modulating elements 22 and 24 located in each branch. The modulating elements 22 and 24 may produce a field-induced refractive index change using the electro-optic effect or the enhanced quantum-confined Stark effect, resulting in respective phase shifts in each branch. The modulator 20 typically generates a high output when the modulator elements 22 and 24 control the phases of their respective light beams to produce constructive interference at the output waveguide 26. Controlling the modulator elements 22 and 24 so that their respective light beams are maximally out of phase with each other results in a low output from the modulator 20.

An interferometric modulator 20 is typically operated in a push/pull mode. For example, in a push/pull mode of operation a high output is generated by the modulator 20 when similar, but oppositely polarized, control signals are applied to respective modulating elements 22 and 24. A low output is generated by the modulator 20 when the polarities of the control signals are reversed. It will be appreciated that this mode of operation produces low chirp on the optical signals thus modulated. A d.c. bias may be applied to the modulating elements 22 and 24 to reach a selected modulator operating point.

The two branches of the interferometer 20 are combined in an output waveguide 26 which is connectable to an optical communications system. An anti-reflection coating 28 may be provided on the output face of the output waveguide 26 to reduce optical losses.

The combiner 14 may be one of several known forms of optical coupler where a plurality of inputs are combined to produce two or more outputs. In one embodiment, a star-coupler is used. In this embodiment an in-plane diffraction region 30 is integrated in the substrate where the light propagating from each of the waveguides W1–W8 freely diffracts and mixes before being output on the output waveguides 16 and 18. A star-coupler advantageously reduces the area of the substrate 12 required for combining the different wavelengths $\lambda 1$–$\lambda 8$.

Each output of a star-coupler generally contains approximately 1/N times the power fed in through one of the input waveguides, where N is the number of output ports. An important feature of one embodiment of the invention implemented with a star-coupler is that the use of two outputs from the combiner 14 introduces an optical power to the interferometric modulator 20 which is approximately twice the power achievable using only a single output from the combiner 14. Alternatively stated, the use of two outputs from the combiner 14 reduces the overall losses by 3 dB. As a result of the reduction in loss, in certain embodiments the need for an amplifier following the combiner 14 is reduced or eliminated.

An additional advantage of using two outputs from the star-coupler is that the need for an input y-branch is avoided. Consequently, the space required for the interferometric modulator 20 is reduced. Furthermore, the transmission losses associated with the S-bends of each input branch are removed, further enhancing the optical throughput of the transmitter 10.

All components L1–L8, W1–W8, 14–26 are integrable on the substrate 12 and may be fabricated using conventional semiconductor fabrication techniques including crystal growth, photolithography, thin film deposition, etching, or combinations of these and other techniques. It will be appreciated that the lasers L1–L8 may be coupled directly to the combiner 14, without using the intervening waveguides W1–W8.

In another arrangment, the modulating elements 22 and 24 may be provided as amplifiers integrated on the substrate 12, having gain profiles encompassing the wavelengths $\lambda 1$–$\lambda 8$. By controlling the current passing through the amplifiers, the interferometric modulator 20 modulates the signal input from the output waveguides 16 and 18 and provides additional gain to increase the amplitude of the optical signals propagating therethrough. The phase of light passing through the amplifier is affected by the amplifier gain. Thus, modulation of the drive currents applied respectively to amplifier modulating elements 22 and 24 results in phase modulation in each arm of the modulator 20, leading to modulation of the light at the modulator output 26. As with conventional modulator elements, amplifier modulating elements may be d.c. biased to achieve a desired level of gain in each arm.

FIG. 2 illustrates a second embodiment of a WDM optical transmitter. A laser array 39 includes lasers L1–Ln, where n is the total number of laser sources. Lasers L1–Ln, are independently driven by current sources S1–Sn through current paths C1–Cn, respectively. Operation of the current sources S1–Sn is controlled by a processor 40. The processor 40 also controls a thermal control unit 42 to maintain the operating temperature of the source 10 within a predetermined range whose limits are determined, in part, by considerations of the temperature-induced wavelength shift of the lasers L1–Ln.

In one mode of operating the source, the processor 40 directs one of the current sources C1–Cn, for example C2, to drive its corresponding laser, L2. Light at wavelength $\lambda 2$ enters the combiner 14 and is coupled into the output waveguides 16 and 18. The light at $\lambda 2$ is modulated by the modulator 20, and the modulated output transmitted through the anti-reflection layer 28 for coupling to a communications system, for example through an optical fiber.

The data to be transmitted on the WDM output 44 enters an information input/output (I/O) driver 46 which receives an incoming data stream and drives the modulator 20 to produce a modulated output carrying the input data. One particular embodiment of the I/O driver 46 is illustrated in FIG. 3A. The I/O driver 46 includes a data input port 50 connected to an electrical ribbon cable 51 carrying parallel input data. The data is transferred from the input port 50 to a multiplexer 52 which multiplexes the electronic data and feeds it to the modulator driver 48. The output 54 from the multiplexer 52 may be electronically multiplexed to a single serial OC-48 stream. The modulator driver 48 produces a driving signal 56 which drives the modulator 20 to modulate the light passing therethrough so as to produce the desired data stream on the WDM output 44.

Another embodiment of the signal control driver 46 is illustrated in FIG. 3B. In this embodiment, the data to be transmitted is received optically rather than electrically. The data may be transmitted through an optical fiber 59 carrying the input data, for example in the OC-48 standard format. The data are received and detected by an optical detector 60. The detector 60 has sufficient bandwidth to detect the high frequencies in the incoming data stream. The signal produced by the detector 60 is then amplified in the amplifier 62 which provides an input signal to the modulator driver 48. A resulting modulator drive signal 56, directed from the modulator driver 48 to the modulator 20, controls the modulator 20 so that the WDM output 44 corresponds to the data received by the detector 60.

FIG. 4 illustrates another embodiment of WDM optical transmitter 100. Several lasers L1–L8 are integrated on a substrate 112. Each of the lasers L1–L8 is connected via an associated waveguide W1 to W8 to a combiner 114. Light from the combiner 114 is taken from a single output waveguide 116 and fed to an interferometric modulator 117. The interferometric modulator 117 includes an input y-branch 118 connected via waveguide arms 121 and 123 to an output y-combiner 120. Each arm 121 and 123 of the modulator 117 includes an optical power regulation section 122 and 124 as a phase modulator. The optical power regulation sections 122 and 124 may be waveguide amplifiers or waveguide attenuators. Waveguide amplifiers are preferably fabricated from the same gain material as the gain medium employed in the lasers L1 to L8. A waveguide attenuator may be, for example, a reverse-biased semiconductor amplifier or a section exhibiting electro-absorption.

The refractive index of an optical power regulation section depends partly on the applied electrical control signal. Thus, modulation of the control signal applied to each optical power regulator section 122 and 124 results in respective changes in the level of optical power propagating beyond each optical power regulation section 122 and 124, along with respective shifts in phase. Each optical power regulation section 122 and 124 may be d.c. biased by the application of a d.c. bias voltage from a bias generator 132, so as to produce a predetermined level of optical power in each arm 121 and 123. The optical power regulation sections 122 and 124 may be biased independently, as shown, or may be biased with a common bias signal. The optical output 130 is modulated by applying a modulation signal to the optical power regulator sections 122 and 124 from the modulator driver 134. Where the regulator sections 122 and 124 employ amplifiers, modulation may be achieved by increasing the drive current to, for example, the first regulator section 122, while decreasing the drive current to the second regulator section 124. It will be appreciated that operating an interferometric modulator in such a push/pull configuration results in low chirp operation and high extinction. It will also be appreciated that the bias generator 132 and the the modulator driver 134 may be combined into a single drive circuit providing a modulated d.c. bias signal to each regulator section 122 and 124.

Modulated semiconductor amplifiers have been shown to modulate light at bit rates of up to 2.5 Gb/s where sufficient light is injected into the semiconductor amplifiers so that the gain is saturated. Thus, the interferometric modulator 117 is suitable for operating at OC-48 data rates where most of the interest in long-haul amplified transmission currently exists.

Advantages of this embodiment include a reduction in the size of the substrate 112, since the functions of amplification and modulation are combined in the interferometric modulator 117, and the need for a separate amplifier section following the modulator is thus avoided.

An additional feature of this embodiment is that the interferometric modulator 117 can equalize the amplitudes of the optical signals combining at the output y-combiner 120, and thus ensure maximum extinction for the "off" state. A sensor 135, positioned to detect a portion of the output 130, feeds a detector signal to a processor 136. The processor 136 checks the on/off ratio of the output 130, i.e. the ratio of the optical power in the logical high state to the power of the logical low state. If the optical power in each arm 121 and 123 not equal, then the on/off ratio is compromised. The processor 136 responds to a detected reduction in the on/off ratio by adjusting the regulation of either or both of the regulation sections 122 and 124 so that the power of the optical signals combined at the output y-combiner 120 are equal, thus maximizing the on/off ratio.

It will be appreciated that each of the optical power regulator sections 122 and 124 may include both amplifying and attenuating portions to allow both an increase and a reduction in the power of the light in the respective modulator arms 121 and 123.

Additional embodiments of interferometric modulator 200 are illustrated in FIGS. 5A–5F. FIG. 5A illustrates an interferometric modulator 200 having a first arm 202 and a second arm 206 receiving respective light inputs from, for example, a star coupler or an input y-branch coupler, alternatively known as a 3 dB coupler. After propagating through the two arms 202 and 206, the light is combined at a y-combiner 210, from which the light propagates through an output waveguide 212. The first arm 202 includes a phase shifter 204 and the second arm 206 includes an optical power regulator 208. The optical power regulator 208 is advantageous when the optical power entering the two arms 202 and 206 is different. For example, the optical power regulator 208 may be an amplifier which is useful when the optical power entering the second arm 206 is less than that entering the first arm 202. The amplifying regulator 208 may be used to amplify the light in the second arm 206, thus permitting the user to equalize the power of the light in the two arms 202 and 206. Alternatively, the optical power regulator 208 may be an attenuator, which is useful if more optical power enters the second arm 206 than the first arm 202. The attenuating regulator 208 may be used to reduce the power in the second arm 206, and thus equalize the optical power in each of the arms 202 and 206. Thus the optical power regulator 208 is effective for maximizing the depth of modulation achievable with the modulator 200. As stated above, in addition to changing the power of the light passing therethrough, the optical power regulator 208 may also be used to alter the light's phase. This embodiment is particularly suited for use where the modulator takes two outputs from a star coupler, which is likely not to have equal optical powers in each output.

FIG. 5B illustrates another embodiment of the modulator 200 in which a phase shifter 214 is included in the second arm 206 and the first arm 202 includes an optical power regulator 216. This embodiment may permit the user to equalize the optical power produced from each arm 202 and 206 irrespective of which arm has the higher power input. Also, the use of an optical power regulator 208 and 216 in each arm 206 and 202 provides the user with greater control over the total optical power output from the modulator 200. Thus, the optical power regulators 208 and 216 may be set to produce an output 216 having a desired power. The phase shifter 214 is used to modulate the output. It will be appreciated that another phase shifter 204 may be disposed in the first arm 202, as illustrated in FIG. 5C. Such an embodiment permits low chirp, push/pull modulation by operating in tandem with the phase shifter 214, as described hereinabove.

It will be appreciated that the modulator 200 may also be provided with a phase shifter 204 in the first arm 202 while the second arm 206 is provided with a phase shifter 214 and an optical power regulator 208, as illustrated in FIG. 5D.

Another embodiment of the modulator 200 is illustrated in FIG. 5E, where phase shifters 204 and 214 are disposed on respective first and second arms 202 and 206. An optical power regulator 218 is positioned in the output waveguide 212. In this embodiment, phase shifting effects of the regulator 218 do not affect the modulation of the signal since the power regulation occurs after interference in the y-combiner 210.

Another embodiment of the modulator 200 is illustrated in FIG. 5F. The modulator 200 is provided with a single phase and intensity modulator 220, which both shifts the phase and regulates the intensity of light passing through the first waveguide 202.

Another embodiment for providing a modulated optical output is illustrated in FIG. 6. In this embodiment, a number of inputs 150 feed into a combiner 152 having four outputs. For example, the combiner 152 may be a star coupler. A first pair of outputs 154 and 156 from the combiner 152 feed into a first interferometric modulator 158. A second pair of outputs 160 and 162 from the combiner 152 feed into a second interferometric modulator 164. Each arm 166, 168, 170, and 172, marked A–D respectively, of the two modulators 158 and 164 is provided with a phase shifter/power regulator 174, 176, 178, and 180 respectively. Each of the phase shifter/power regulators 174, 176, 178, and 180 may independently include a phase shifter, a power regulator or a combination of both a shifter and a regulator. The outputs 182 and 184 from respective modulators 158 and 164 are combined at the y-branch combiner 186.

The optical output 188, E, generated by this embodiment permits pulse amplitude modulation. Assume that each signal A, B, C, and D has the same power, P, and the same phase. Thus, the output E, given by the linear superposition of all the signals is equal to 4P, if propagation and combiner losses are ignored. If, for example, the phase of D is altered by 180°, then signals C and D cancel each other, and the output E has a value of 2P. If the phase of B is altered, then A cancels B. Since C cancels D, the output E has a power of zero. Thus, this embodiment produces an output 188 having three possible levels, i.e. a gray scale, and the modulator is referred to as a gray scale modulator.

The levels of the gray scale generated by the various combinations of inputs A–D are illustrated in Table 1. In this table, a bar below the signal indicates that the signal is out of phase by 180° from those signals without the bar.

TABLE I

| Output E as a function of inputs | | | | |
|---|---|---|---|---|
| A | B | C | D | E |
| A | B | C | D | 4P |
| A | B | C | *D* | 2P |
| A | B | *C* | D | 2P |
| A | *B* | C | D | 2P |
| *A* | B | C | D | 2P |
| A | B | *C* | *D* | 0 |
| A | *B* | C | *D* | 0 |
| *A* | B | C | *D* | 0 |
| A | *B* | *C* | D | 0 |
| *A* | B | *C* | D | 0 |
| *A* | *B* | C | D | 0 |

It will be appreciated that other combinations exist where three and four signals are out of phase by 180°. However, these combinations are similar to those where one and none are out of phase by 180°. In other words, where an odd number of signals is underlined, the output is 2P and when the signals are all underlined the output is 4P.

It will also be appreciated that for each additional interferometric modulator added to this embodiment, where the additional modulator is fed by the combiner 152 and the output of the additional modulator is combined with the outputs of the other modulators, then another scale level is added. Thus, one modulator produces two scale levels, two modulators produce three scale levels, three modulators produce four scale levels, and so forth.

Another embodiment for providing modulation and amplification is illustrated in FIG. 7. A substrate 250 is provided with an active channel waveguide 252 that passes from the laser 254, through an interferometric modulator 256 to an output waveguide region 258. An advantage of this approach is that the waveguide 252 may be fabricated in a single operation, thus avoiding the necessity of fabricating waveguides from different materials. When a waveguide of a first material is used in the laser and a waveguide of a second material is used in the modulator, it is difficult to match the inputs and outputs of the different waveguides.

The modulator 256 is an interferometric modulator with first and second arms 260 and 262. Modulation in each arm is provided by phase modulators 264 and 266 in each arm 260 and 262 respectively. The phase modulators may be phase shifters, amplifiers or attenuators, or combinations thereof, as described above.

Amplifier regions may be provided on the substrate 200 by forming electrodes over certain portions of the waveguide 252. For example, an electrode 270 formed over the waveguide 252 at the input y-branch 268 provides a gain region at the input section of the modulator 256. Additionally, another gain region at the output y-combiner 272 of the modulator 256 may be provided by applying a second electrode 274 over the output y-combiner 272.

The application of a d.c. forward bias to the gain regions under the electrodes 270 and 274 permits amplification of the signal generated by the laser 254. Further amplification may be provided if the phase modulators 264 and 266 include amplifiers.

Advantages of this embodiment include ease of fabrication, in that the entire waveguide, from the laser 254 to the output region 258 may be fabricated in a single operation. This avoids the requirement of fabricating a modulator waveguide from a material different from that used in the waveguide in the light source. Additionally, the use of amplifiers permits the generation of a powerful modulated optical output signal 276.

The waveguides of the other embodiments described herein may also be fabricated in a single operation so as to be formed of the same material as the active waveguide in the light source or sources. Thus, for example, the transmitter 10 illustrated in FIG. 1 may be provided with waveguides W1–W8, a combiner 14 and output waveguides 16 and 18 all formed in the same operation, and from the same material, as the gain regions of the lasers L1–L8. In addition, the modulating elements 22 and 24 may be amplifiers operated in a push-pull configuration, and the output waveguide 26 may be operated as an amplifier. Furthermore, other waveguiding regions may be provided with electrodes so as to form amplifying regions. For example, the waveguides W1 to W8 may be provided with electrodes, either individually or in combination, in order to amplify signals generated by the lasers L1 to L8.

While various examples were provided above, the present invention is not limited to the specifics of the examples. For example, the transmitter need not be provided with only eight lasers, but may be provided with a greater or lesser number of lasers, as required for a particular application. It is understood that the coupler has a sufficient number of inputs to accept light from all the lasers present. Although the operation of the embodiments described above has disclosed the operation of only one laser at any one time, this is not a necessary condition. Two or more lasers may operate simultaneously.

The I/O driver is not intended to be restricted to the specific embodiments illustrated. The I/O driver may, for example, receive a number of optical signals, or a combination of electrical and optical signals, multiplex the received signals and direct a multiplexed drive signal to a driver.

A gray scale modulator need receive its input from a combiner. For example, a gray scale modulator could receive an input from a single waveguide, where the single waveguide is connected to a first y-branch divider, and the outputs from the first y-branch divider are respectively connected to a second and a third y-branch divider to obtain four inputs to the gray scale modulator. Additional y-branch dividers may be used to feed additional interferometric modulators included the gray scale modulator.

As noted above, the present invention is applicable to optical communications systems as a transmitter source. It is believed to be particularly useful in WDM applications as a wavelength selectable transmitter. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An interferometric optical modulator, comprising:
    an input divider that divides an input light beam into first and second light beams;
    first and second modulator arms that receive, respectively, the first and second light beams;
    an optical power regulator disposed in the first modulator arm that regulates the optical power of the first light beam;
    an optical phase regulator disposed in one of the first and second modulator arms; and
    an output combiner coupled to the first and second modulator arms that combines the first and second light beams into a single modulated light output.

2. A modulator as recited in claim 1, wherein the input divider comprises an amplifying y-branch waveguide.

3. A modulator as recited in claim 1, wherein the output combiner comprises an amplifying y-combiner waveguide.

4. A modulator as recited in claim 1, further comprising a d.c. bias generator operatively coupled to the first and second amplifiers, and a modulator driver operatively coupled to the first and second amplifiers.

5. A modulator as recited in claim 1, wherein the optical power regulator comprises an optical amplifier.

6. A modulator as recited in claim 1, wherein the optical power regulator comprises an optical attenuator.

7. A modulator as recited in claim 1, further comprising a light source coupled to the input divider to provide the input light thereto.

8. A modulator as recited in claim 1, further comprising a controller operatively couplable to the optical power and phase regulators to maximize extinction ratio of the modulator.

9. A modulator as recited in claim 1, further comprising a substrate, wherein the first and second modulator arms, the optical power regulator and the output combiner are integrally formed on the substrate.

10. A modulator as recited in claim 1, wherein the phase shifter and the power regulator comprise the same component.

11. A gray scale modulator, comprising:
    a first interferometric modulator including a first modulator arm and a second modulator arm arranged to receive light, a first output combiner coupled to the first and second arms, and a first phase modulator disposed in at least one of the first and second modulator arms to modulate a phase of the light passing therethrough;
    a second interferometric modulator including a third modulator arm and a fourth modulator arm arranged to receive light, a second output combiner coupled to the third and fourth arms, and a second phase modulator disposed in at least one of the third and fourth modulator arms to modulate a phase of the light passing therethrough, wherein at least one of the first and second phase modulators comprises an optical power regulator; and a third output combiner coupled to the first and second output combiners to combine modulated outputs from the first and second interferometric modulators.

12. A gray scale modulator as recited in claim 11, further comprising a first input arm to receive the light, the first input arm coupled to second and third input arms, the second input arm connected to the first and second modulator arms and the third input arm connected to the third and fourth modulator arms.

13. A gray scale modulator as recited in claim 10, further comprising a star coupler coupled to the first, second, third and fourth modulator arms.

* * * * *